(12) United States Patent
Sapire

(10) Patent No.: US 10,512,365 B2
(45) Date of Patent: Dec. 24, 2019

(54) FOOD PROCESSOR

(71) Applicant: CAPBRAN HOLDINGS, LLC, Los Angeles, CA (US)

(72) Inventor: Colin Sapire, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 80 days.

(21) Appl. No.: 15/838,248

(22) Filed: Dec. 11, 2017

(65) Prior Publication Data

US 2018/0132666 A1     May 17, 2018

Related U.S. Application Data

(63) Continuation of application No. 15/078,432, filed on Mar. 23, 2016.

(51) Int. Cl.
| | |
|---|---|
| *A47J 43/00* | (2006.01) |
| *A47J 43/08* | (2006.01) |
| *A47J 43/07* | (2006.01) |
| *A47J 43/06* | (2006.01) |

(52) U.S. Cl.
CPC ............. *A47J 43/082* (2013.01); *A47J 43/06* (2013.01); *A47J 43/075* (2013.01); *A47J 43/0716* (2013.01); *A47J 43/0755* (2013.01); *A47J 43/0777* (2013.01); *A47J 43/08* (2013.01)

(58) Field of Classification Search
CPC .... A47J 43/082; A47J 43/0777; A47J 43/075; A47J 43/06; A47J 43/0716; A47J 43/0755; A47J 43/08
See application file for complete search history.

(56) References Cited

U.S. PATENT DOCUMENTS

| | | | | |
|---|---|---|---|---|
| 4,387,860 | A * | 6/1983 | Necas | A47J 43/044 |
| | | | | 241/282.1 |
| 7,993,054 | B2 * | 8/2011 | Wulf | A47J 43/042 |
| | | | | 366/205 |
| 8,403,556 | B2 * | 3/2013 | Wu | A47J 43/0777 |
| | | | | 241/37.5 |
| 2002/0176320 | A1 * | 11/2002 | Wulf | A47J 43/042 |
| | | | | 366/205 |
| 2005/0207273 | A1 | 9/2005 | Newman et al. | |
| 2005/0269434 | A1 | 12/2005 | Starr | |
| 2010/0251906 | A1 | 10/2010 | Repp et al. | |
| 2017/0105578 | A1 * | 4/2017 | Krebs | A47J 43/0722 |

\* cited by examiner

*Primary Examiner* — Anshu Bhatia
(74) *Attorney, Agent, or Firm* — Trojan Law Offices

(57) ABSTRACT

A versatile food processing system that can work with plurality of top-mounted food processing units of different types and sizes is disclosed. The motor base of the food processing system has a locking mechanism and safety actuators at different radial locations so that food processing units of different sizes can utilities the safety mechanism. One particular processing unit is especially useful for making noodles and vegetable strips. The processing unit comprises a stationary outer vessel and a rotating inner vessel. Blades are located on an inner lid of the inner vessel. The inner vessel spins in unison with the inner lid without a central shaft to avoid harm caused by the shaft to the quality of the resulting noodles.

19 Claims, 9 Drawing Sheets

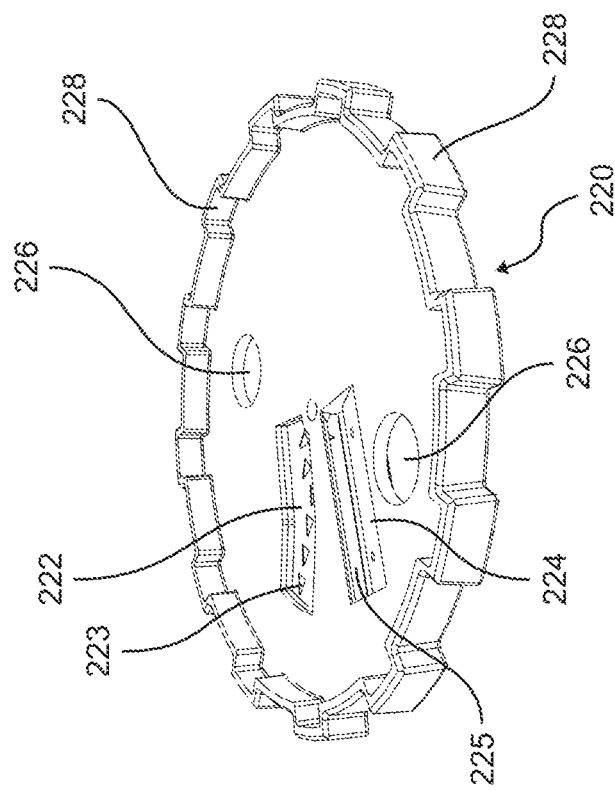
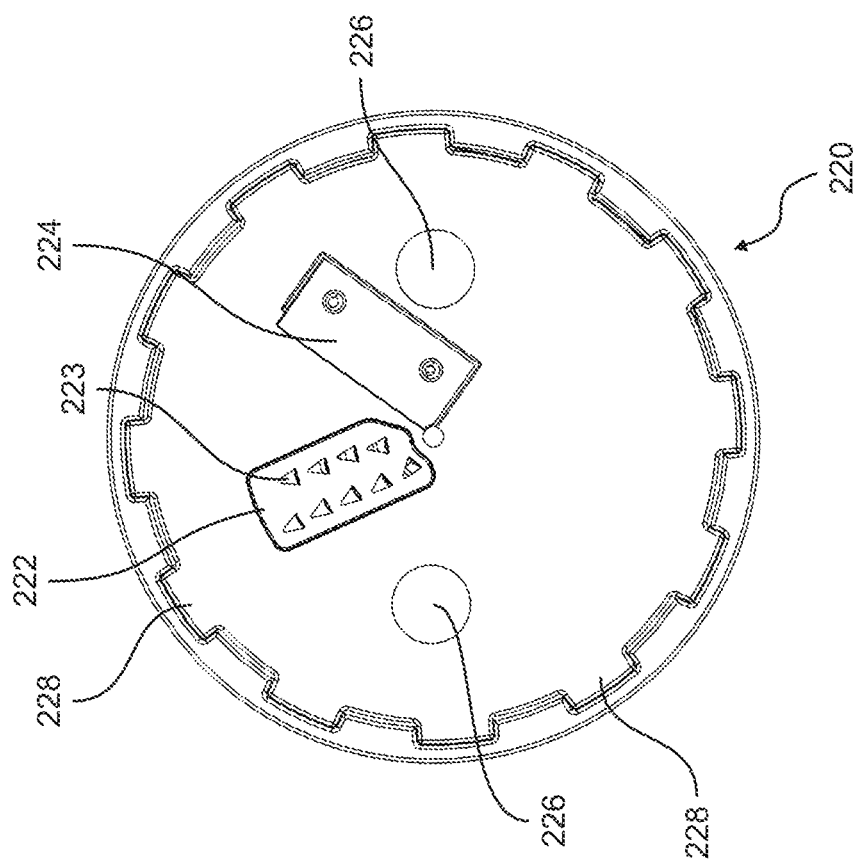
Fig. 15
Fig. 14

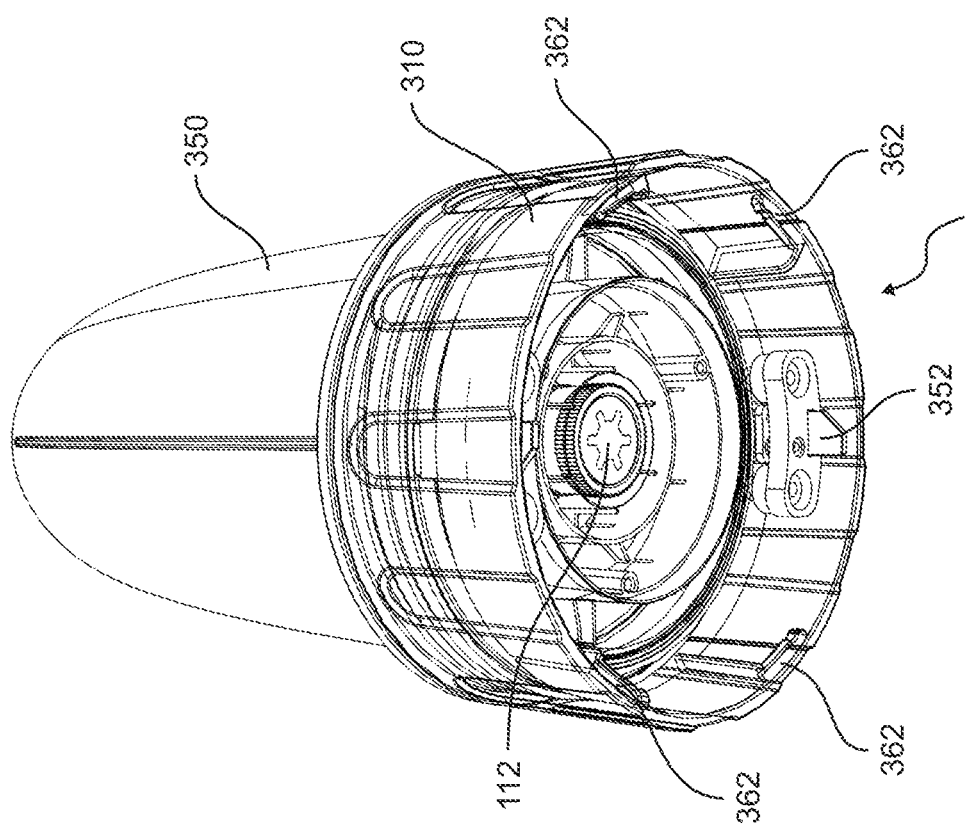

FOOD PROCESSOR

CROSS REFERENCE TO RELATED APPLICATIONS

This is a continuation application of International Application PCT/US16/61683, with an international filing date of Nov. 11, 2016.

TECHNICAL FIELD OF THE DISCLOSURE

The present teachings relate to household and kitchen appliances. More particularly, the present teachings relate to food processors. Even more particularly, the present teachings relate to versatile and high performance food processors capable of working with different food processing units and capable of making noodles and vegetable strips.

BACKGROUND

There are increasing demands in electrical household food processors, including blenders, mixers, slicers and noodle makers. Traditionally, users needed to buy different kinds of food processors separately because of processor design constraints. To address the need presented by these constraints, kitchen appliance manufacturers have began to offer food processing systems that have a common motor base and different top-mounted food processing units.

Even though this type of all-in-one food processing system has become increasingly popular, the functionality of top-mounted food processing units are still often restricted by the common motor base. There are also safety concerns in operating food processing systems. For example, some systems allow users to operate the systems when the blade is exposed. This creates potentially hazardous situations when users accidentally turn on the processor and are cut by the fast moving blades or slicers.

One common type of top-mounted food processing unit is a noodle maker. A noodle maker allows users to push in vegetables to turn the vegetables into fine strips. For example, using a noodle maker, a user can turn carrots into strips that can be used in salad. Traditional noodle makers often produce unsatisfactory results because the strips are easy to break inside the noodle maker and the quality of the strips is also not uniform.

SUMMARY

It is an objection of the present invention to provide a high performance food processor that is versatile and able to process a wide range of foods. It is also an objective of the present invention to provide safety features to different processing units regardless of the size, type and design of the processing units. It is a further objective of the present invention to provide a processing unit that can make noodles and vegetable strips of high quality.

In one embodiment of the present invention, a food processing system may work with different top-mounted food processing units that removably engage with a motor base. Examples of different top-mounted food processing units could be a noodle-making vessel, a blending vessel, and a slicing unit.

In one aspect of some embodiments of the present invention, the motor base comprises a first motor coupling, a second motor coupling, and a third motor coupling. The motor couplings are driven by a planetary gear system at different driving speeds. The top-mounted food processing units may utilize any of the motor couplings to achieve different rotating speeds for processing a variety of foods.

In another aspect of some embodiments of the present invention, the surface of the motor base comprises an inner ring and an outer ring. The inner ring has a plurality of flanges protruding radially outward. It also has a pair of lock-in channels in which an inner safety actuator is located. The outer ring also has a pair of lock-in channels in which an outer safety actuator is located. The safety actuators provide a safety mechanism for the food processing system so that the motor can be turned on to drive any rotating blade or slicer only when a key protective enclosure of a top-mounted food processing unit is present and closed. As such, the motor will not rotate the blade, or slicer, when they are exposed. In one particular embodiment, the safety actuators at the inner ring and at the outer ring connect to the same safety mechanism inside the motor base so that the motor can operate when either safety actuator is pressed.

In some embodiments, the top-mounted food processing units all have safety structures that press the safety actuator at either the inner ring or the outer ring. For example, in one embodiment, the processing unit comprises an outer vessel on which an outer lid is pivotally mounted. The outer lid can be opened and closed. The outer vessel has two rods that slide vertically between an upper position and a lower position and slightly protrude downward from the bottom of the outer vessel. When the outer lid is closed, the outer lid pushes the rods to the lower position causing the rods to protrude downward. The rods are located at the positions of the outer safety actuators when the processing unit sits on top of the motor base. Hence, the rods press the safety actuators only when the outer lid is closed because the rods do not provide sufficient downward force to press the safety actuators when the outer lid is opened. This safety mechanism ensures that the food processing system cannot be operated when the blade on an inner lid of the processing unit is exposed when the outer lid is opened.

Those skilled in the art would appreciate that another aspect of some embodiments in the present invention is that the processing system is versatile and safe to work with top-mounted food processing units that have different sizes. In one embodiment, a top-mounted processing unit is a blending unit that is smaller than other processing units. The blending unit comprises a blade base and an elongated-shaped vessel. The vessel is removably engaged with the blade base by a pairing of screw threads. The blade base contains slidably mounted rods that slide between an upper position and a lower position. The rods are pushed downward when the vessel is screwed in. The rods are located at the relative positions of the inner safety actuators. The rods can activate the safety mechanism without having to press the outer safety actuators. The presence of safety actuators at different radial locations allows top-mounted processing units of different sizes to be able to be securely mounted on the motor base and equally activate the safety mechanism.

It is further aspect of some embodiments of the present invention to have a food processing unit that produces noodles and vegetable strips of high quality. In one embodiment, the top-mounted food processing unit comprises a stationary outer vessel, an outer lid, a rotatable inner vessel, and an inner lid that has a blade and a food passage opening on its surface. The inner vessel comprises a circular wall, a bottom and a cavity defined by the solid wall and the bottom. The cavity allows processed foods to be received. The cavity is shaft free at the center of the inner vessel. The inner vessel has a rotary coupler, which can have a shape that is complementary to a motor coupling. The rotary coupler allows the inner vessel to be directly or indirectly driven by the motor coupling.

When the inner lid sits on top of the inner vessel, the inner lid is secured in place with the inner vessel. As such, the inner lid can be carried by the inner vessel so that the inner vessel moves in unison with the inner lid during rotation. In one particular implementation, the inner vessel's circular wall has a plurality of recesses on the wall's top edge. The inner lid has a plurality of protrusions at its circumference. The protrusions are complementary in shape and position with the recesses so that the inner lid can be secured in place with the inner vessel by matching the recesses with the protrusions. Hence, the inner vessel and inner lid will rotate in unison. The center of the inner lid is largely smooth and does not have a shaft extending downward from the lid. In this way, the cavity of the inner vessel in between the center of the lid and the center of the inner vessel is shaft free.

The arrangement that is free of a shaft provides a significant advantage in making noodles or cutting foods, particularly vegetables, into strips. If there were a central shaft present inside the vessel to rotate the lid, the strips would tend to settle around the shaft, creating friction about the rotating components, and sometimes sufficiently strangle the shaft to slow it down. This also adversely affects the quality of the noodles and strips, causing ripping and clumping of the same. The absence of a shaft significantly improves the quality of the processed noodles or vegetable strips.

BRIEF DESCRIPTION OF THE DRAWINGS

The present teachings may be better understood by reference to the following detailed description taken in connection with the following illustrations, wherein:

FIG. 14 is a top view of a lid of an inner vessel of a food processing system in accordance with an embodiment of the present invention.

FIG. 15 is a bottom perspective view of lid shown in FIG. 13.

FIG. 18 is a bottom perspective view of a blending unit in accordance with an embodiment of the present invention.

DETAILED DESCRIPTION OF EMBODIMENTS

Figure 3:
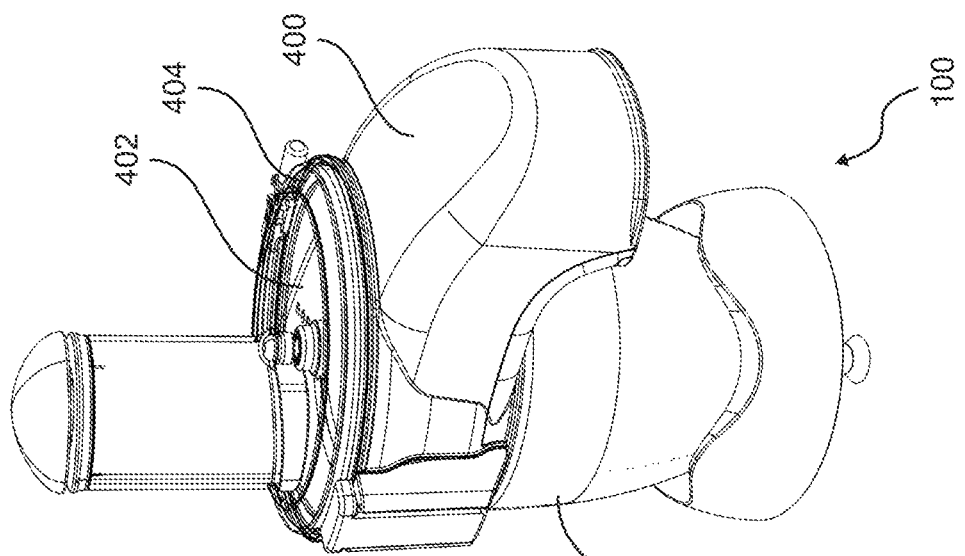
FIG. 3 is a perspective view of a food processing system with a slicing unit in accordance with an embodiment of the present invention.

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

The following description is made for the purpose of illustrating the general principles of the invention and should not be taken in a limiting sense. The scope of the invention is best determined by reference to the appended claims.

Referring to FIGS. 1-4, a food processing system 100 is shown with different top-mounted food processing units 200, 300, or 400 that removably engage with a motor base 110 in accordance with some embodiments of the present invention. In accordance with an embodiment, the motor base 110 can have at least a noodle-making vessel 200, a blending vessel 300, or a slicing unit 400 mounted on top of it. While the top-mounted processing units are provided with specific names, those skilled in the art would understand that the top-mounted processing units are not limited to performing the features of its name. For example, a noodle-making vessel 200 may also be a generic processing unit that slices foods, depending on the design of the blade and the slicers in the unit 200.

Figure 5:
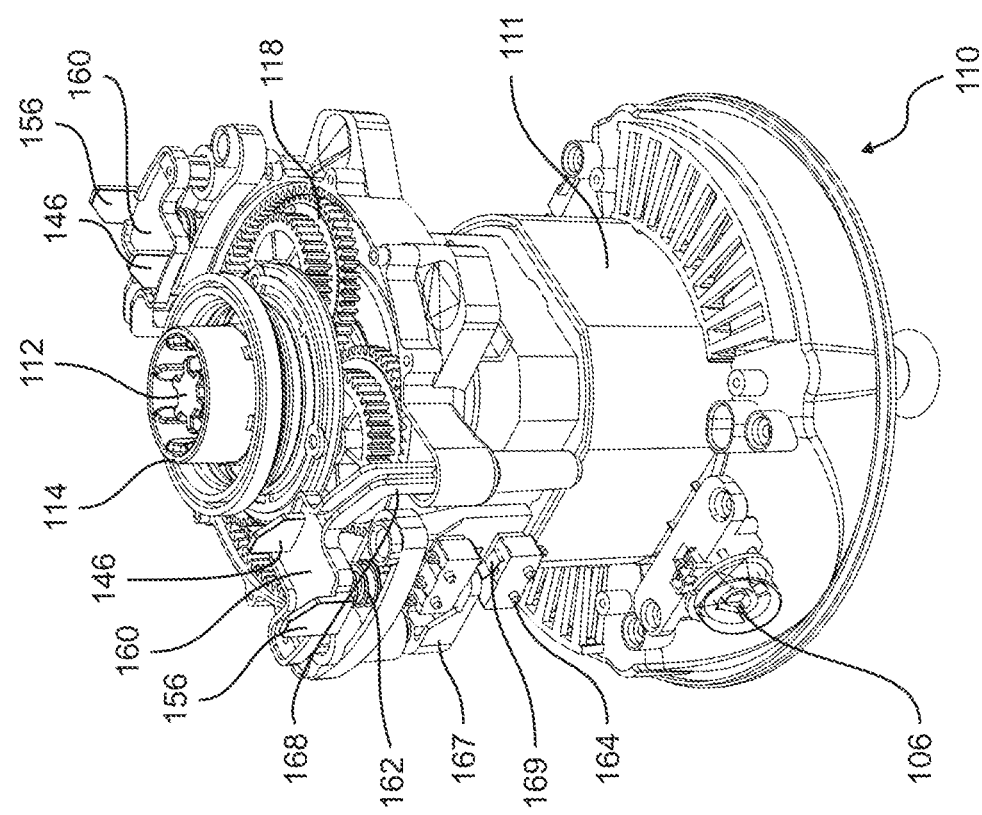
FIG. 5 is an internal view of the motor base shown in FIG. 4.
Figure 4:
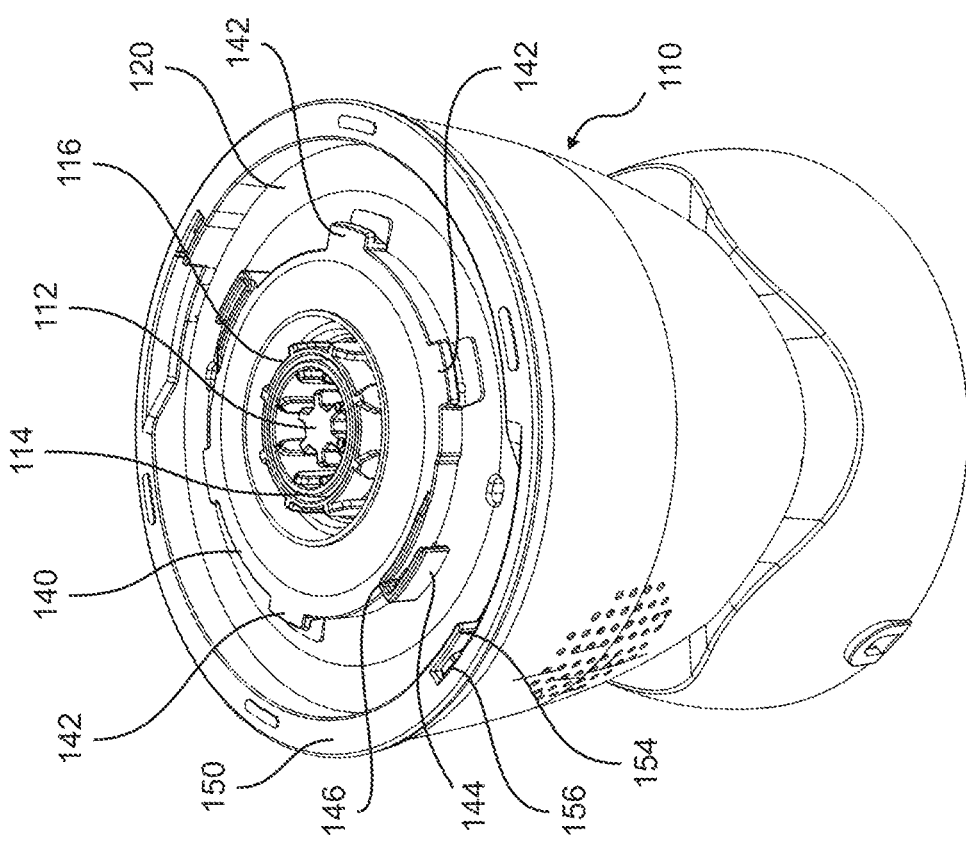
FIG. 4 is a perspective view of a motor base of a food processing system in accordance with an embodiment of the present invention.

Referring specifically to FIGS. 4 and 5, the motor base 110 in accordance to an embodiment of the present invention is shown comprising a motor 11 that is securely mounted inside its housing, a well 120 which creates a space for different top-mounted food processing units 200, 300, or 400 to be inserted, a first motor coupling 112, a second motor coupling 114, and a third motor coupling 116.

The motor couplings 112, 114, and 116 each on their walls have radially extending teeth that create grooves and teeth for coupling and engaging the rotating components of the top-mounted food processing units 200, 300, or 400. The motor couplings 112, 114, and 116 are driven by the motor 111 through a planetary gear system 118 so that they rotate at different speeds. In a particular embodiment, the first motor coupling 112 rotates at the fastest speed while the third motor coupling 116 rotates at the slowest speed. While in the particular embodiment shown in FIG. 4 the first motor coupling 112 is the innermost outlet and rotates at the fastest speed, those with ordinary skill in the art would understand that any arrangement of motor couplings are possible and the first motor coupling 112 does not have to be the innermost outlet or the fastest rotating outlet.

Figure 2:
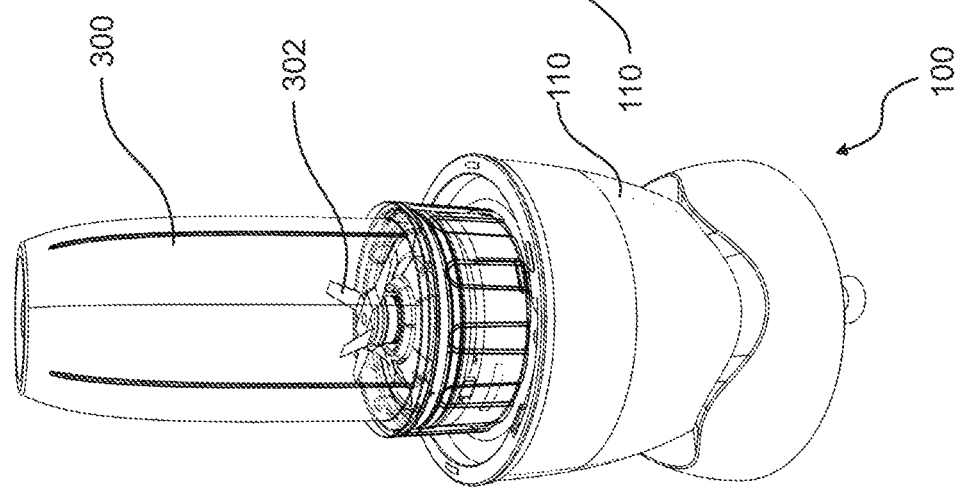
FIG. 2 is a perspective view of a food processing system with a blending vessel in accordance with an embodiment of the present invention.
Figure 1:
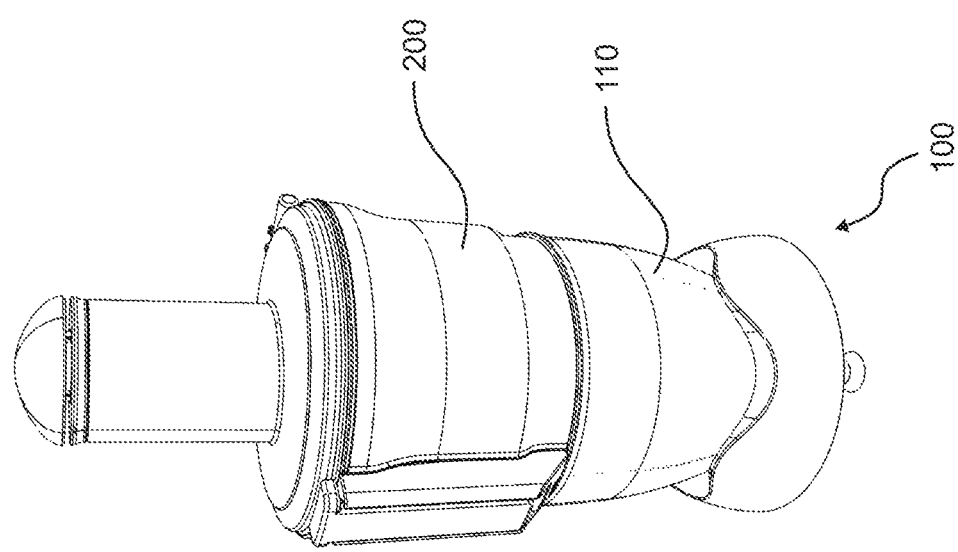
FIG. 1 is a perspective view of a food processing system with a noodle-making vessel in accordance with an embodiment of the present invention.

The motor base 110 having motor couplings with different rotating speeds allows the top-mounted food processing units 200, 300, or 400 to utilize different rotating speed. For example, FIG. 2 shows a blending vessel 300 that has a blade 302 for the purpose of agitating and disintegrating food and liquid mixture in high speed. As such, for a particular embodiment, the blending vessel 300 has a rotary coupler that is complementary in shape with the first motor coupling 112 so that the blade 302 of the blending vessel 300 is driven by the fastest first motor coupling 112. In another embodiment, the primary goal of the slicing unit 400 is to cut foods in relatively large pieces. Such cutting only requires a low-speed slicer 402. Hence, the slicing unit 400 has a rotary coupler that is complementary in shape with the third motor coupling 116 so that the slicer 402 of the slicing unit 400 is driven by the third motor coupling 116. While only two examples of a matching of top-mounted food processing units and motor couplings are discussed here, those skilled in the art would understand that the matching and the kinds of top-mounted food processing units are not limited to these two examples. By utilizing different motor couplings, different kinds of food processing units can be used.

Still referring to FIGS. 4 and 5, the motor base 110 further comprises an inner ring 140 and an outer ring 150. The inner ring 140 has a plurality of flanges 142 protruding radially outward. It also has a pair of lock-in channels 144. In each of the lock-in channels 144, an inner safety actuator 146 is located. The outer ring 150 also has a pair of lock-in channels 154 in which outer safety actuators 156 are located. The inner safety actuators 146 are located at a first radial location relative to the center of the motor base and the outer safety actuators 156 are located at a second radial location relative to the center of the motor base. As such, the outer safety actuators 156 are farther away from the center of the motor base than the inner safety actuators 146.

The inner and outer safety actuators 146 and 156 provide a safety mechanism for the food processing system 100 so that the motor 111 can be turned on to drive a rotating blade or slicer only when a protective enclosure of a top-mounted food processing unit is present and closed. As such, any rotating blade or slicer cannot be driven when a proper safety enclosure is not present, which will be discussed in further detail immediately below.

Referring to FIG. 5 in which the internal view of the motor base 110 is shown, the safety mechanism comprises a plate 160 that is positioned vertically between an upper position and a lower position. The plate 160 is biased by a spring 162 so that it naturally resides at its upper position unless it is compressed by an external force to its lower position. The plate 160 is connected to the safety actuators 146 and 156, which protrude vertically upward from the plate 160. The plate 160 has a first end 166 that is connected to an activation arm 167 extending downward. The activation arm 167 also has an upper position and a lower position and is positioned above a micro switch 164. The position of the activation arm 167 is controlled by the position of the plate 160. The plate 160 is also connected to a second arm 168, which mainly provides balance and counter-weight for the first arm 166. While in this particular embodiment the plate 160 is connected to the activation arm 167 which is in a L-shape, those skilled in the art would appreciate other configurations are possible so long as the plate 160 can interact with the micro switch 164.

The food processing system 100 can only be operated when the plate 160 is pushed down. When the plate 160 is at its natural upper position, the activation arm 167 is also at its upper position in which it cannot activate the micro switch 164. When either the inner safety actuator 146 or the outer safety actuator 156 is pressed, the actuator overcomes the recoiling force of the spring 162 and pushes down the plate 160 to its lower position, causing the activation arm 167 also to move to its lower position. The activation arm 167 activates the micro switch 164 and closes the circuit of the motor 111. Hence, when either the inner safety actuator 146 or the outer safety actuator 156 is engaged, users can operate the food processing system 100 by using the switch 106. When neither the safety actuator is pressed, the food processing system 100 does not respond even though the switch 106 is pressed.

Figure 7:
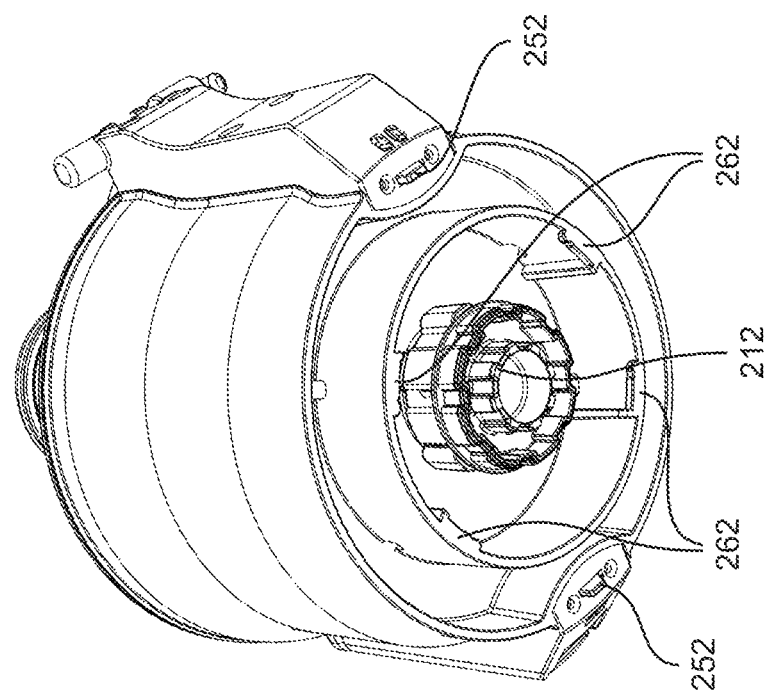
FIG. 7 is a bottom perspective view of the processing unit shown in FIG. 6.
Figure 6:
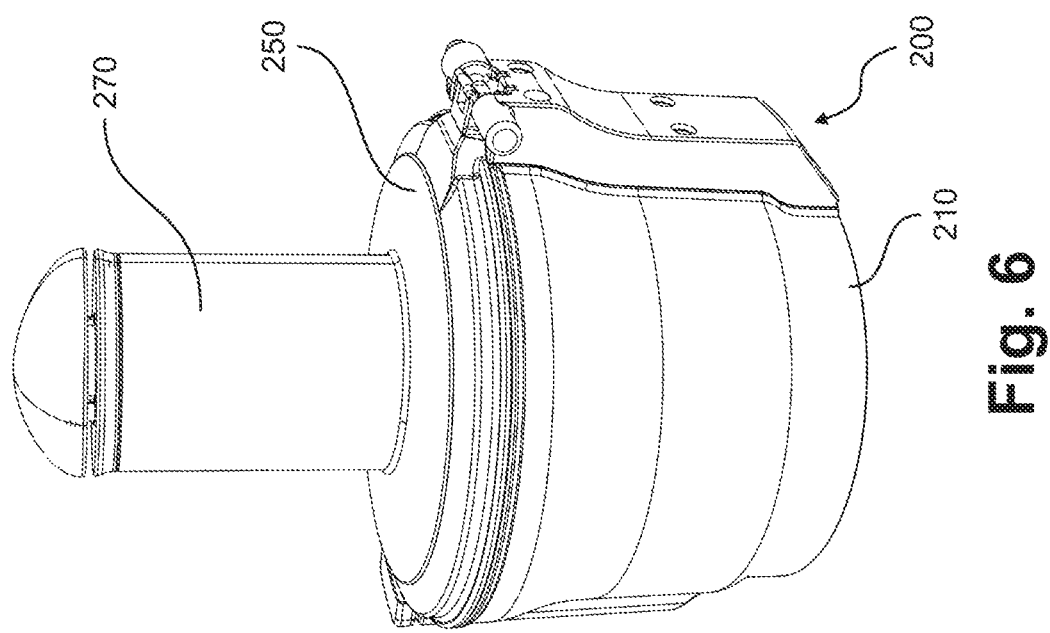
FIG. 6 is an isolated perspective view of a first processing unit in accordance with an embodiment of the present invention.
Figure 9:
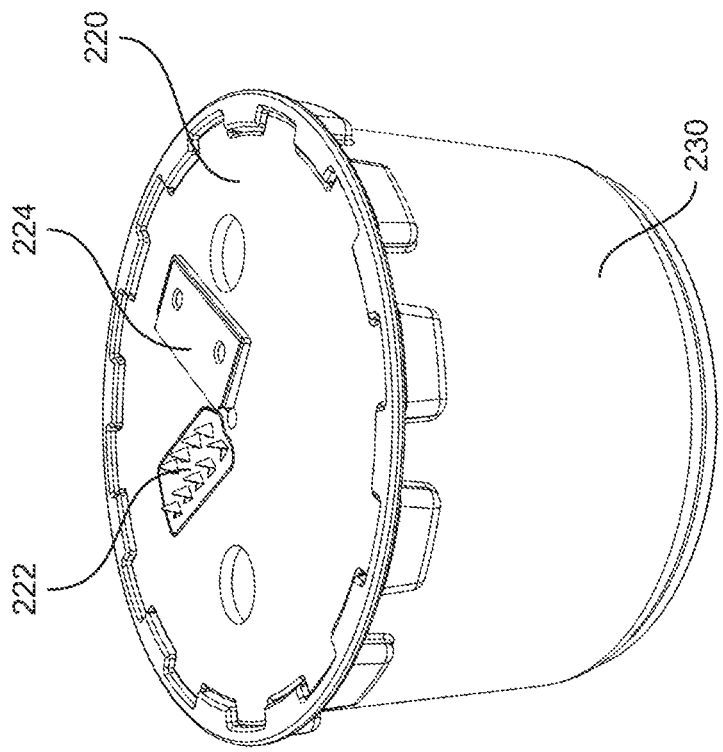
FIG. 9 is an inner vessel and its lid of a first processing unit in accordance with an embodiment of the present invention.

The top-mounted food processing units 200, 300, and 400 all have safety structures that press either the inner safety actuator 146 or the outer safety actuator 156 only when a key protective enclosure of the food processing unit is present and closed. Referring to FIGS. 6 and 7, which show a first kind of top-mounted food processing unit 200, the unit 200 comprises an outer vessel 210 on which an outer lid 250 is pivotally mounted. The outer lid 250 can be opened and closed. The outer vessel 210 has two rods 252. The rods slide vertically between an upper position and a lower position and are slightly protruding downward from the bottom of the outer vessel 210. When the outer lid 250 is closed, the outer lid 250 pushes the rods 252 to the lower position. In turn, the rods 252 are protruding downward. The rods 252 are located at the relative positions of the outer safety actuator 156 when the food processing unit 200 is positioned on top of the motor base 110. Hence, the rod 252 engage the outer safety actuator 156 only when the outer lid 250 is closed because the rod 252 does not provide sufficient downward force to press the outer safety actuator 156 when the outer lid 250 is opened. In this particular embodiment, the outer lid 250 is the key protective enclosure that must be present and closed before the food processing system 100 can be operated. The safety mechanism ensures that the food processing system 100 cannot be operated when the inner lid 220 is exposed.

Figure 17:
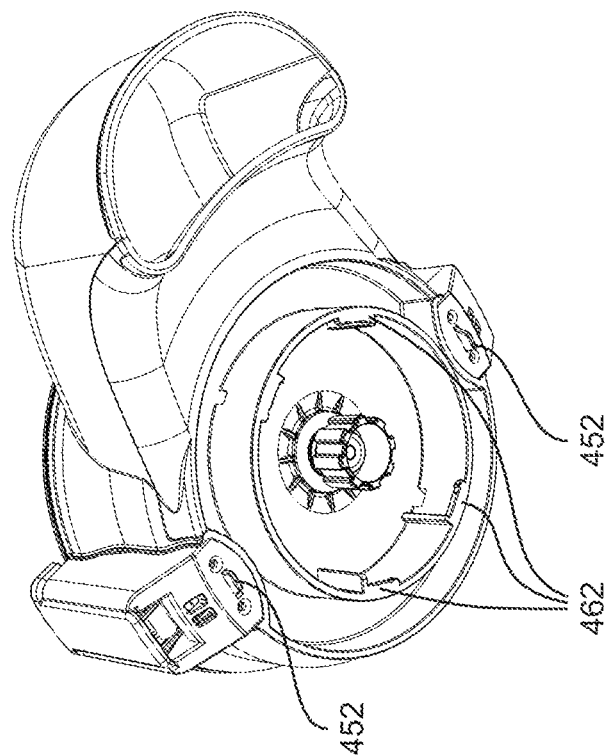
FIG. 17 is a bottom perspective view of the slicing unit shown in FIG. 15.
Figure 16:
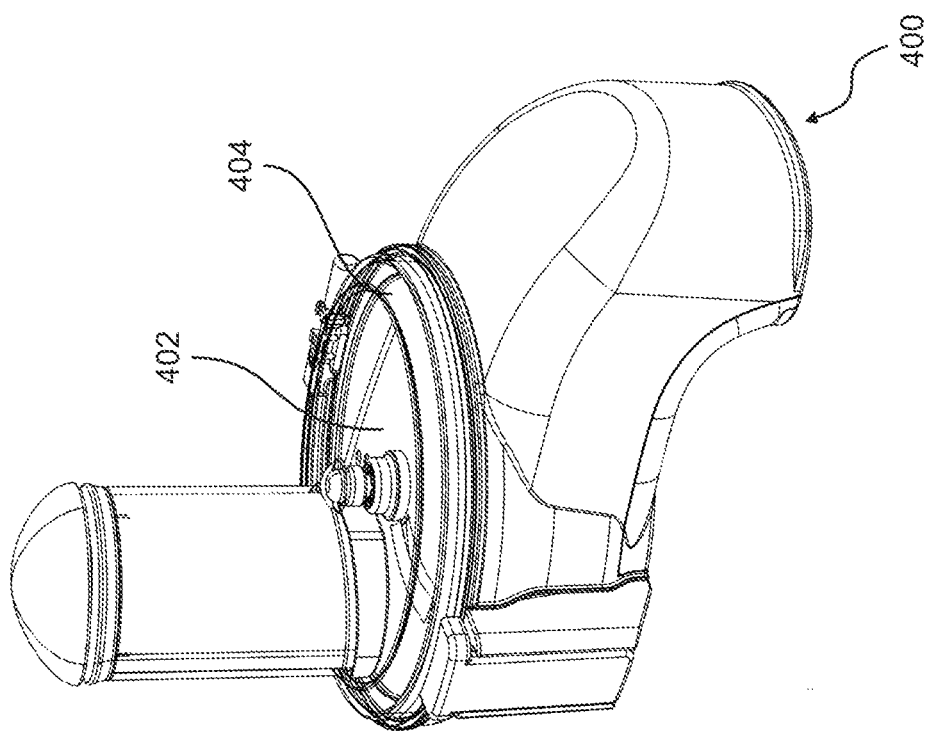
FIG. 16 is a perspective view of a slicing unit of a food processing system in accordance with an embodiment of the present invention.

Similarly, referring to FIGS. 16 and 17, the slicing unit 400 has a slicer 402 that is covered by a lid 404 when operating. The slicing unit 400 contains a safety structure that is similar to the one shown for the unit 200. It also contains slidably mounted rods 452 that are located at the positions of the outer safety actuators 156 and that will engage the outer safety actuators 156 when the lid 404 is closed. In this particular embodiment, the outer lid 404 is the key protective enclosure that ensures that the slicer 402 cannot be driven by the motor 111 when the slicer 402 is exposed.

FIG. 18 is the bottom view of a blending unit 300 in accordance with an embodiment of the present invention. The blending unit 300 mainly comprises a blade base 310, on which a blade 302 is rotatably mounted on an elongated vessel 350. The vessel 350 is removably engaged with the blade base 310 by a pairing of screw threads. The blade base 310 also contains slidably mounted rods 352 that slide between an upper position and a lower position. The rods 352 are forced downward when the vessel 350 is screwed in. The rods 352 are located at the positions of the inner safety actuators 146. In this particular embodiment, the vessel 350 is the key protective enclosure that must be present and screwed in before the food processing system 100 can be operated. This safety structure prevents the blade base 310 from engaging with a motor coupling when the vessel 350 is not screwed in.

Now referring back to FIG. 4, the flanges 142, the inner lock-in channels 144, and the outer lock-in channels 154 allow the top-mounted food processing units 200, 300, or 400 to engage with the motor base 110 securely and to activate the safety mechanism of the food processing system 100. The secured engagement and locking between the motor base 110 and a food processing unit is achieved by sliding the rods 252, 353, or 452 of the food processing unit into the lock-in channels 144 and also sliding a retaining tabs 262, 362, or 462 of the food processing unit underneath the flanges 142.

As those skilled in the art would appreciate, food processing units serves different purposes and may require different sizes. For example, the slicing unit 400 mainly slices vegetable such as carrots into relatively large pieces compared to the foods being processed by the blending unit 300 that serves for making smoothies and juices. Hence, comparing FIGS. 2 and 3, the slicing unit 400, including its diameter, is considerably larger than the blending unit 300. The motor base 110 is adapted to secure the top-mounted food processing units and be able to activate the safety mechanism even though the food processing units are of different sizes. The flanges 142 in the inner ring 140 and the lock-in channels and safety actuators in both inner ring 140 and outer ring 150 allow food processing units with different sizes to be able to be removably mounted and engaged with the motor base 110 securely and safely.

For example, as shown in FIG. 7, the bottom of the processing unit 200 has a plurality of retaining tabs 262 that are located at the relative positions of the flanges 142. The retaining tabs 262 are L-shaped in this particular embodiment, but those skilled in the art would understand that other shapes are also possible for the retaining tabs. The horizontal part of the retaining tabs 262 slides underneath the flanges 142 when the processing unit 200 is mounted on and engaged with the motor base 110. The vertical part of the retaining tabs 262 prevents the retaining tabs 262 from moving pass the flanges 142. The rods 252 are located at the relative positions of the outer lock-in channels 154 so the rods 252 can press the outer safety actuators 156 located at the outer ring 150 of the motor base 110 when the key protective enclosure is closed. Referring to FIG. 17, the slicing unit 400 shows a similar retaining tab.

Now referring to FIG. 18, the blending unit 300 has a smaller diameter compared to the food processing units 200 and 300. The blending unit 300 also has a plurality of L-shaped retaining tabs 362. However, the rods 352 are located at the relative positions of the inner lock-in channels 144 so that the rods 352 can also activate the safety mechanism by engaging the inner safety actuators 146 instead.

The locking of the food processing units and the activation of the safety mechanism are both important. Hence, the flanges 142 and the safety actuators 146 and 156 are positioned at special locations so that any food processing units can only be inserted under two orientations. This make sure a food processing unit mounted on the motor base 110 will be secured while the safety actuators can be pressed. In one particular embodiment shown in FIG. 4, the flanges 142 and the safety actuators 146 or 156 are each separated apart by 60°. Using the middle of the left lock-in channel 144 as the starting point, the flanges 142 are located at 60°, 120°, 240°, and 300° while the safety actuators 146 are located at 0° and 180°. The same arrangement is used for the rods and the retaining tabs on the bottom of a food processing unit, such as that, in FIG. 7, the rods 252 are located at 0° and 180° and the L-shaped retaining tabs are located at 60°, 120°, 240°, and 300°.

Figure 13:
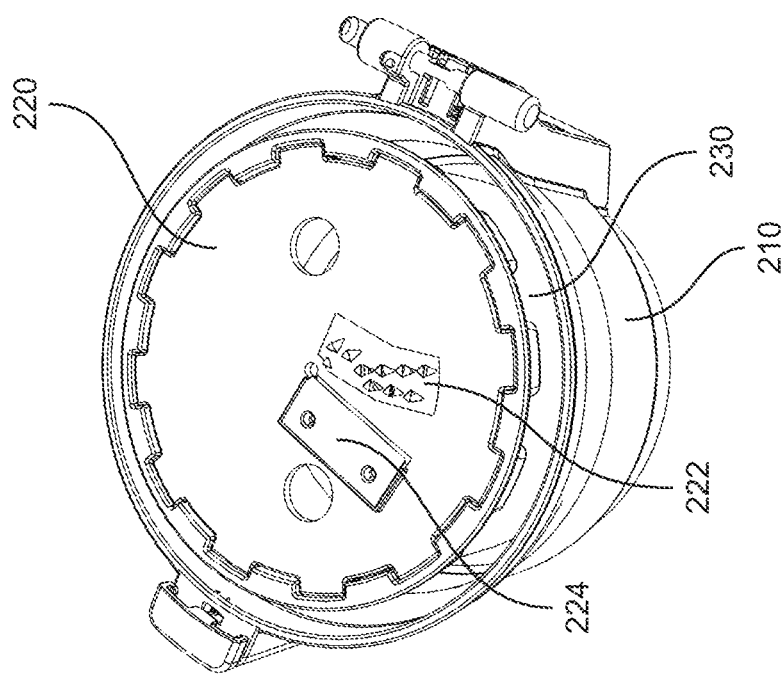
FIG. 13 is a view showing the outer vessel and the inner vessel shown in FIG. 11, but the inner vessel with the lid sitting on top of it.
Figure 12:
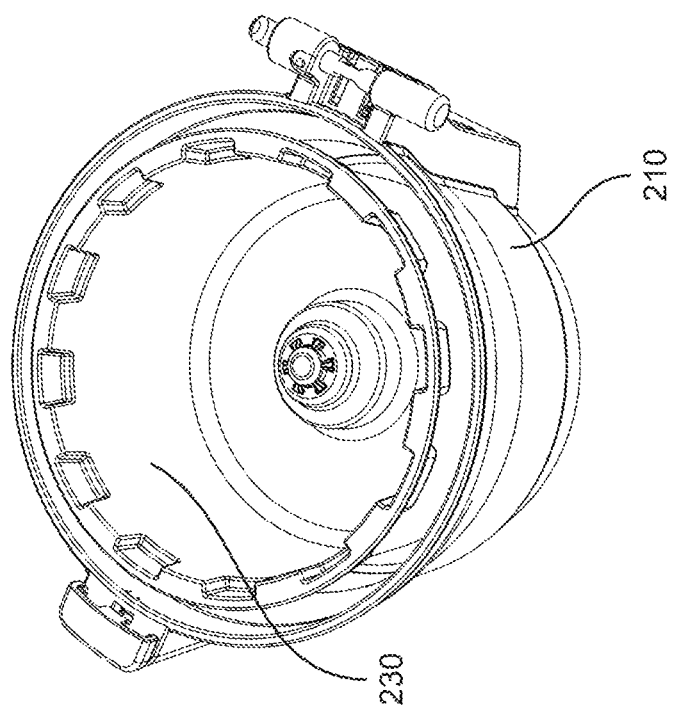
FIG. 12 is an isolated view of an outer vessel and an inner vessel without the outer lid of a first processing unit in accordance with an embodiment of the present invention.

Now referring to FIGS. 6, 12, and 13, according to one embodiment, the processing unit 200 comprises a stationary enclosure that can be called an outer vessel 210 and a food receiving vessel 230 which can be called an inner vessel 230. The enclosure is stationary because when the processing unit 200 in mounted on the motor base 110, only the inner food receiving vessel 230 will rotate but the outer vessel or enclosure 210 will remain stationary and secured by the locking mechanism discussed above. The enclosure 210 has an outer lid 250 that is pivotally mounted on the stationary enclosure. Inside the outer vessel 210, the inner vessel 230 is removably mounted. The inner vessel 230 can be taken out by the user after foods have been processed in the inner vessel 230. The inner vessel 230 also has a lid that can be called an inner lid 220.

Figure 11:
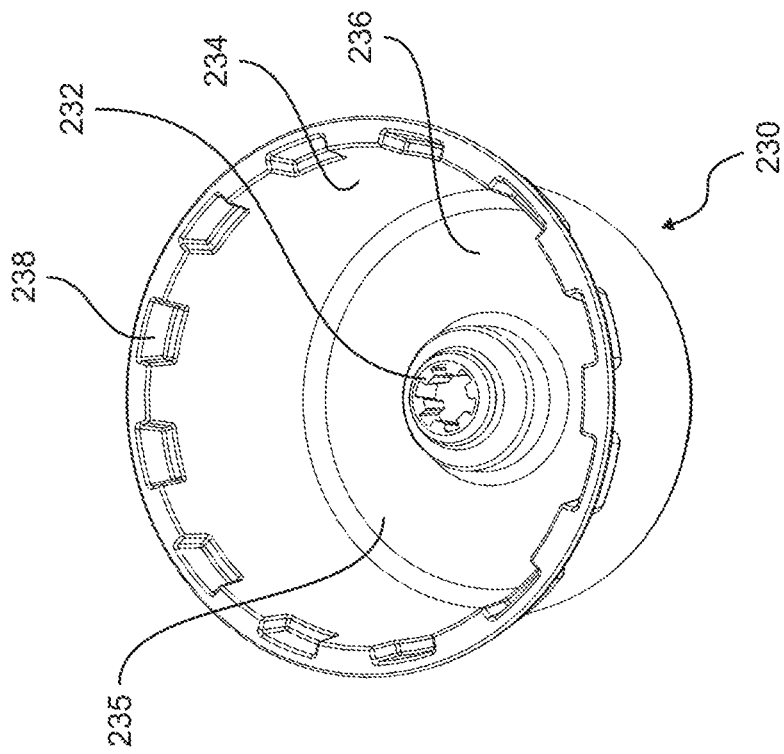
FIG. 11 is a top view of the inner vessel without its lid.
Figure 10:
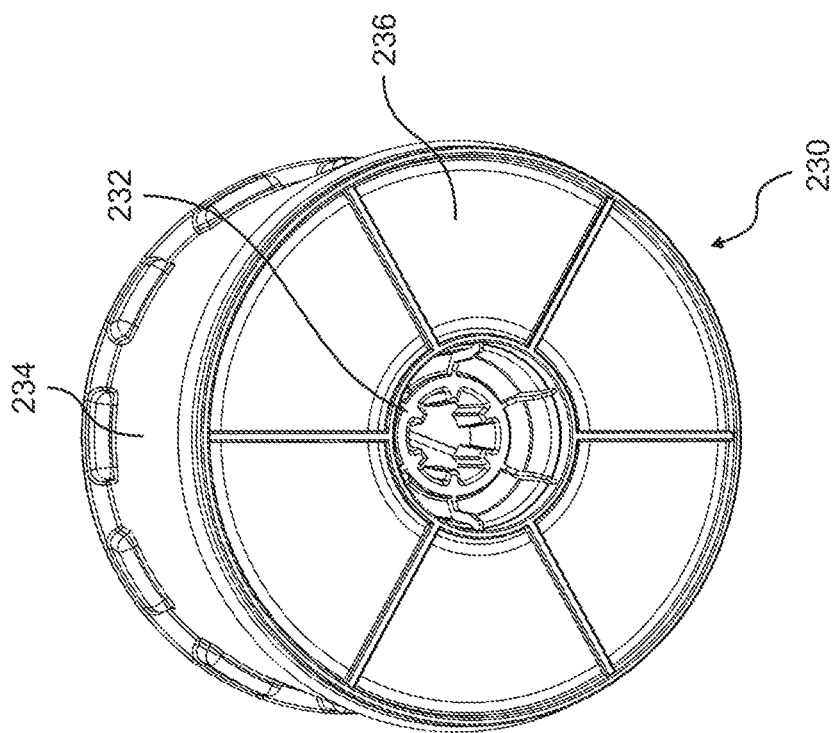
FIG. 10 is a bottom view of the inner vessel shown in FIG. 9.

Referring to FIGS. 10 and 11, the top and bottom perspective views of a food receiving vessel 230 are shown, which can be called the inner vessel of processing unit 200. The food receiving vessel 230 comprises a circular solid wall 234, a bottom 236 and a cavity 235 defined by the solid wall 234 and the bottom 236. The cavity 235 allows processed foods to be received. The cavity 235 is shaft free especially at the center of the food receiving vessel 230. The food receiving vessel 230 also comprises a rotary coupler 232, which can have a shape that is complementary to a motor coupling 112, 114, or 116. The rotary coupler 232 allows the food receiving vessel 230 to be directly or indirectly driven by the motor coupling to rotate when the food receiving vessel 230 engages with the motor base 110. Those skilled in the art would understand that the shape of the rotary coupler 232 can vary.

The rotary coupler 232 can also be directly or indirectly engaged with a motor coupling. In one embodiment, the food receiving vessel 230 can be directly mounted on the motor base 110. When it is mounted on the motor base 110, a motor coupling engages the food receiving vessel 230. In this arrangement, the outer stationary enclosure 210 has an opening at its bottom (not shown in the figures) so that the food receiving vessel 230 can directly engage with the motor base 110.

Figure 8:
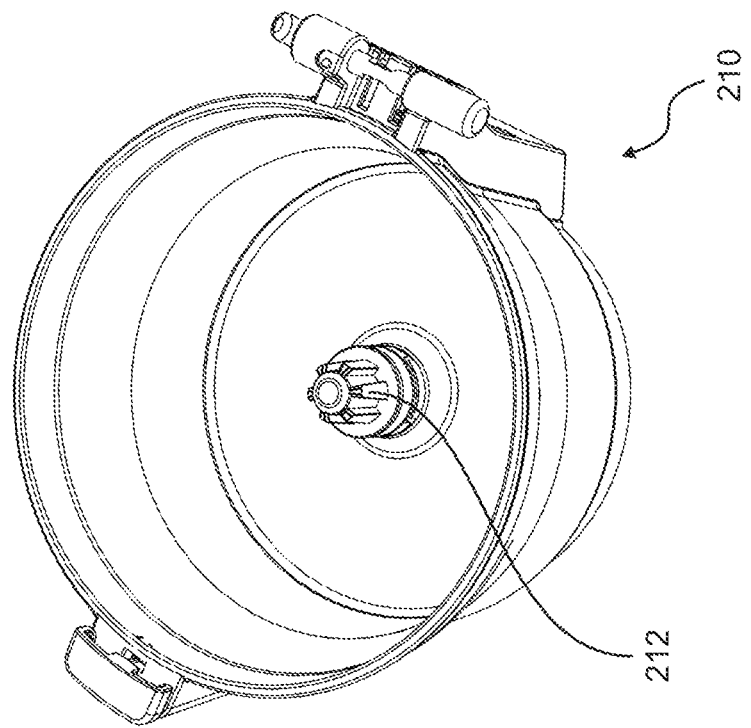
FIG. 8 is an isolated view of an outer vessel of a first processing unit in accordance with an embodiment of the present invention.

In another embodiment, the food receiving vessel 230 is indirectly engaged with the motor coupling. Referring to FIGS. 7 and 8, the top and bottom of an outer vessel 210 is shown. The outer vessel 210 has an outer rotary coupler 212 at its center. The outer rotary coupler 212 is rotatable when the outer vessel 210 remains stationary. It has two parts. On the outside bottom of the outer vessel 210 (FIG. 7), the outer rotary coupler 212 has a shape that is complementary to one of the motor couplings 112, 114, or 116. On the inside of the outer vessel 210 (FIG. 8), the outer rotary coupler 212 has a shape that is complementary to the inner rotary coupler 232 of the inner vessel 230 so that the inner vessel 230 can engage with the outer vessel's rotary coupler 212. Hence, when the outer vessel 210 is mounted on the motor base 110 and the inner vessel 230 is mounted on the outer vessel 210, the motor coupling drives the rotation of the inner vessel 230 indirectly via the rotating outer rotary coupler 212.

FIGS. 14 and 15 show a top view and a bottom perspective view of a lid 220 that is adapted to be mounted on the food receiving vessel 230. On its surface, the inner lid 220 has a leading blade 222, which has a plurality of food passage openings 223 for food to pass through lid 220, and a trailing blade 224 that has a straight cutting edge and a straight food passage opening 225. The inner lid 220 also has two finger openings 226 for users to insert their finger so that the inner lid 220 can be lifted easily from the inner vessel 230. While a particular arrangement of a pair of blades is shown in FIG. 14, those skilled in the art would understand that any other number, arrangements, and design of blades are also possible for the lid 220.

When the inner lid 220 sits on top of the inner vessel 230, the inner lid 220 is secured in place with the inner vessel 230. As such, the inner lid 220 can move in unison with the inner vessel 230 during rotation but is stationary relative to the inner vessel 230. Those skilled in the art would understand that there are different ways to secure the inner lid 220 in place with the inner vessel 230. In one particular embodiment shown in FIGS. 11, 13, 14, and 15, the inner vessel's circular wall 234 has a plurality of recesses 238 on the wall's top edge. The inner lid 220 has a plurality of protrusions 228 at its circumference. The protrusions 228 are complementary in shape and position with the recesses 238 so that the inner lid 220 can be secured in place with the inner vessel 230 by a mating of the recesses and the protrusions. In another embodiment, the inner lid 220 is pivotally mounted on the inner vessel 230 so that the inner lid 220 is secured in place with the inner vessel 230 by a hinge.

Now referring to FIGS. 6, 11, 13, and 15, since the inner lid 220 is secured in place with the inner vessel 230, the rotation of the inner vessel 230 will carry the inner lid 220. There is no need for a shaft to be present underneath the inner lid 220. The bottom of the center of the inner lid 220 may be largely planar and smooth and does not have a shaft extending downward from the lid 220. In this way, the cavity 235 of the inner vessel in between the center of the lid 220 and the center of the inner vessel 230 is shaft free. In other words, there is no shaft to connect the lid 220 and the inner vessel 230 at the center of the vessel.

The arrangement that is free of a shaft provides significant advantage in making noodles or cutting foods, particularly vegetables, into strips. Referring specifically to FIGS. 6 and 13, when users insert food into the processing unit 200 via the food channel 270, the food will reach and be processed by the inner lid 220. The lid 220 rotates counter-clockwise so that the blade 222 is the leading blade and the blade 224 is the trailing blade. Thus, the food will first be processed by the leading blade 222 resulting in the food being cut into strips. The food cut into strips will be further processed when it is cut by the straight blade 224 to form individual strips. Since the blades are rotating, the processed strips have a tendency to settle into swirls in the food receiving vessel 230. If there were a central shaft present inside the vessel to rotate the lid 220, the strips would tend to settle around the shaft, there by restricting the movement of the rotating components. The absence of a shaft significantly improves the operation of the invention and significantly increases the quality of the processed noodles or vegetable strips.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

I claim:

1. A food processor, comprising:
   a motor base including a first motor coupling adapted to removably engage with a first food processing unit;
   an outer vessel being removably mounted on the motor base;
   an inner vessel being removably mounted within the outer vessel, inner vessel including a rotary coupler for engaging the first motor coupling; and
   an inner lid including a blade and a food passage opening on a surface of the inner lid;
   wherein the inner lid is secured on top of the inner vessel so that the inner vessel moves in unison with the inner lid during rotation; and
   wherein the inner vessel does not include a shaft.

2. The food processor of claim 1, wherein the motor base further includes a second motor coupling that rotates at a speed different than the first motor coupling and the second motor coupling is adapted to removably engage with a second food processing unit.

3. The food processor of claim 2, wherein the motor base further includes:
   an outer safety actuator located at a first radial location relative to a center of the motor base;
   an inner safety actuator located at a second radial location relative to a center of the motor base; and
   a circuit that controls a motor of the motor base so that the motor is only turned on when either the outer safety actuator or the inner safety actuator is depressed.

4. The food processor of claim 3, wherein:
   the outer vessel includes an outer lid that is pivotally mounted and a first rod that is located in proximity to the outer safety actuator when the outer vessel is mounted on the motor base;
   the first rod sliding vertically between a lower position and an upper position such that the outer lid pushes the first rod to the lower position when the outer lid is closed, and in turn, the first rod depresses the outer safety actuator; and
   the second food processing unit including a second rod that engages with the inner safety actuator when the second food processing unit is mounted on the motor base such that the second rod can depress the inner safety actuator.

5. The food processor of claim 1, wherein:
   the inner lid is removable from the inner vessel;
   the inner vessel further includes a circular wall;
   the circular wall having a top edge that includes a recess; and
   the inner lid further includes a protrusion that is complementary to the recess of the inner vessel such that the inner lid is secured to the inner vessel by alignment of the recess and the protrusion.

6. The food processor of claim 1, wherein the inner lid is pivotally mounted on the inner vessel such that the inner lid is secured to the inner vessel by a hinge.

7. The food processor of claim 1, wherein:
   the motor base further includes a flange;
   the outer vessel includes a retaining tab adapted to slide in the flange to lock the outer vessel to the motor base.

8. The food processor of claim 1, wherein:
   an outer lid is pivotally mounted on the outer vessel;

the motor base further includes a safety actuator;
the outer vessel includes a rod that slides vertically between a lower position and an upper position;
wherein the outer lid pushes the rod to the lower position when the outer lid is closed, and in turn, the rod presses the safety actuator.

9. The food processor of claim 1, wherein the outer vessel includes a bottom opening so that the rotary coupler of the inner vessel is directly driven by the first motor coupling.

10. The food processor of claim 1, wherein:
the outer vessel includes a rotatable outer vessel rotary coupler that;
the outer vessel rotary coupler removably engages with the first motor coupling; and
the inner vessel rotary coupler removably engages with the outer vessel rotary coupler so that the inner vessel rotary coupler is indirectly driven by the first motor coupling.

11. The food processor of claim 1, wherein:
the blade on the inner lid is a leading blade;
the inner lid further includes a trailing blade;
the leading blade including a plurality of small openings; and
the trailing blade including a straight cutting edge.

12. The food processor of claim 1, wherein the inner lid further includes a plurality of finger openings.

13. A food processor comprising:
a motor base including a motor coupling adapted to removably engage with a first food processing unit;
a food receiving vessel removably mounted on the motor base;
the food receiving vessel being driven by the motor coupling; and
the food receiving vessel having a radial wall and a bottom;
the radial wall and the bottom of the food receiving vessel defining a cavity for receiving food; and
a lid positioned on the food receiving vessel;
the lid secured to the food receiving vessel so that the lid rotates with the food receiving vessel;
wherein the food receiving vessel does not include a shaft;
the lid includes a blade and a food passage opening; and
whereby food may be removed from the cavity without a need to unwrap the food from around a shaft
wherein the motor base is connected to a stationary enclosure that surrounds the food receiving vessel such that access to the food receiving vessel is prevented when the food receiving vessel is rotating.

14. The food processor of claim 13, wherein a bottom surface of the lid is uniformly planar.

15. The food processor of claim 13, wherein:
the lid is removable from the food receiving vessel;
the radial wall of the food receiving vessel includes a top edge with a recess;
the lid further includes a protrusion that is complementary to the recess of the radial wall of food receiving vessel such that the lid is secured in place with the food receiving vessel by matching of the recess with the protrusion.

16. The food processor of claim 13, wherein the lid is pivotally mounted on the food receiving vessel so that the lid is secured in place with the food receiving vessel by a hinge.

17. The food processor of claim 13, wherein:
the blade of the lid is a leading blade and the lid further includes a trailing blade;
the leading blade includes a plurality of small openings; and
the trailing blade includes a straight cutting edge.

18. The food processor of claim 13, wherein the motor base further includes:
a motor;
an outer safety actuator located at a first radial location relative to a center of the motor base;
an inner safety actuator located at a second radial location relative to a center of the motor base; and
a circuit that controls the motor such that the motor is only turned on when the outer safety actuator or the inner safety actuator is depressed.

19. The food processor of claim 18, wherein:
the motor base is connected to a stationary enclosure that surrounds the food receiving vessel;
the stationary enclosure preventing access to the food receiving vessel when the food receiving vessel is rotating;
the stationary enclosure including an outer lid that is pivotally mounted and a first rod that is located at the outer safety actuator;
the rod sliding vertically between a lower position and an upper position, such that the outer lid pushes the first rod to the lower position when the outer lid is closed, and in turn, the first rod presses the outer safety actuator; and
the motor base is adapted to engage with a second food processing unit;
the second food processing unit including a second rod that is located for engagement with the inner safety actuator when the second food processing unit is mounted on the motor base such that the second rod can depress the inner safety actuator.

* * * * *